Nov. 12, 1929.    A. SKLENAŘ    1,735,137
VIBRATORY CHUTE OR CARRIER
Filed April 29, 1925
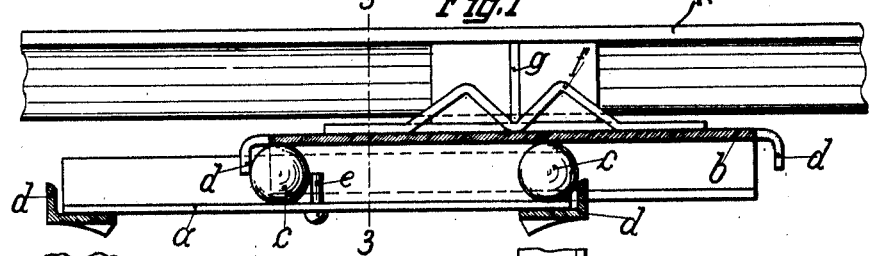
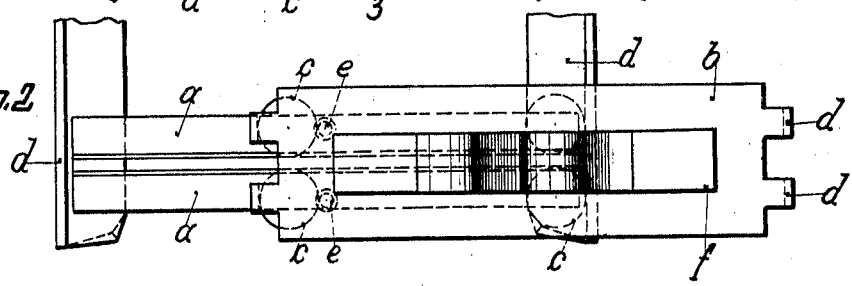
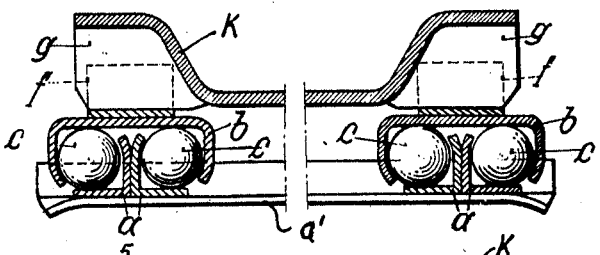
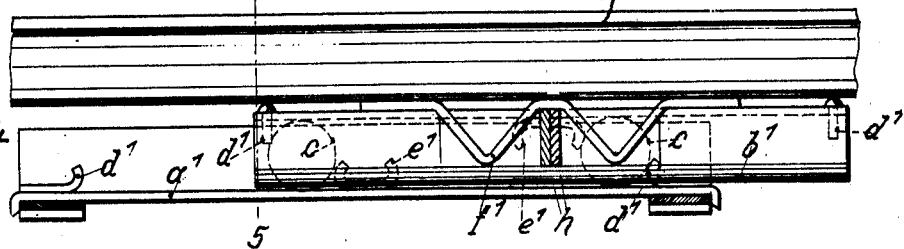
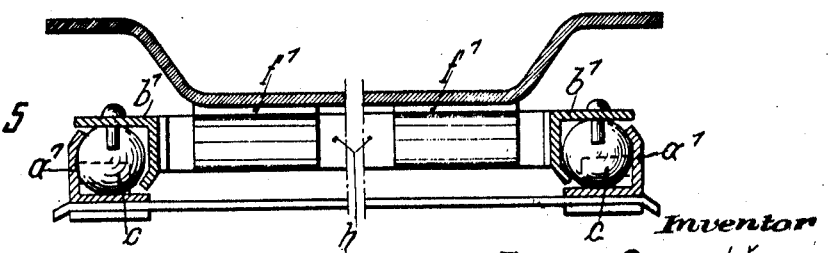
Inventor
Anton Sklenař

Patented Nov. 12, 1929

1,735,137

UNITED STATES PATENT OFFICE

ANTON SKLENÁŘ, OF LAZY, CZECHOSLOVAKIA

VIBRATORY CHUTE OR CARRIER

Application filed April 29, 1925, Serial No. 26,789, and in Czechoslovakia June 24, 1924.

This invention has reference to vibratory chutes or carriers of the reciprocable type employed in mines and for various industrial purposes.

A purpose of the invention is to provide a generally improved construction in which the supporting frame for the carrier element is formed as a separate unit embodying upper and lower race members having suitable balls, rolls or other anti-friction elements interposed therebetween, the marginal portions of the upper and lower members of each raceway being shaped to embrace the interposed anti-friction elements in such manner as to prevent vertical separation of said members.

Another purpose of the invention is to provide an improved connection between the carrier element and its supporting frame which permits the carrier element to have a rocking or tilting movement with reference to said frame to thereby enable the structure to be mounted on uneven surfaces such as an unlevelled pit bottom.

Other purposes, advantages and characteristic features of the invention will be more readily apparent from consideration of the following detailed description taken in connection with the accompanying drawings in which, Figure 1 is a longitudinal sectional view of a structure designed in accordance with the present invention;

Figure 2 is a plan view of the supporting frame for the carrier element;

Figure 3 is a transverse sectional view taken along the line 3—3 of Figure 1;

Figure 4 is a longitudinal view, partly in section, of a slightly modified construction, and, Figure 5 is a transverse sectional view taken along the line 5—5 of Figure 4.

In Figures 1 to 3 inclusive there is disclosed an arrangement in which the carrier element is mounted on a supporting frame comprising a pair of parallel raceways, the upper and lower members of which are separated by a double series of anti-friction balls interposed therebetween.

The lower member of each raceway may consist of a pair of angle irons $a$ arranged with their vertical flanges butted together and their horizontal flanges extending outwardly upon opposite sides of said vertical flanges, as shown to advantage in Figures 2 and 3. The horizontal flanges of the angle irons $a$ may be connected by any suitable arrangement of cross members $a'$ so as to constitute a sufficiently strong supporting base. The upper member $b$ of each raceway is substantially U-shaped in cross section and is supported by a double series of anti-friction balls $c$ arranged at opposite sides of the vertical flanges of the lower member or angle irons $a$. The side portions of the member $b$ and the vertical flanges of the lower member or angle irons $a$ are bent toward each other and into embracing engagement with the intervening ball $c$ in such manner as to prevent vertical displacement of the member $b$. Suitable stops $d$ and $e$ of any suitable construction may be positioned as shown in Figures 1 to 3 inclusive to limit the rolling movement of the balls along the raceways provided therefor between the members $a$ and $b$.

In the modified construction disclosed in Figures 4 and 5 the lower member of each raceway consists of an angle iron bar $a^1$, while the upper race consists of an angle iron bar $b^1$. The upper parallel members $b^2$ of the runways thus provided are preferably connected by a spacing fish-plate or the like $h$, so as to secure them in position in the transverse direction with relation to the lower members $a^1$. Suitable adjusting means may also be provided in connection with the fish plate or the like by composing the plate or the like of two or more sectional, relatively displaceable portions, so as to enable the operator to vary the distance of the two guide races $b^1$. The angle iron bars $a^1$ and $b^1$ of each runway are inwardly bent towards the balls or rollers $c$ on their longitudinal sides, as shown particularly in Figure 5, so as to embrace the balls or rollers with a rugged supporting seat. Stops $d^1$ and $e^1$ of any suitable kind are provided in this modification likewise to limit the movement of the balls or the like along the races.

Reverting to the form of construction illustrated in Figures 1 to 3 it will be noted that the upper members $b$ of the two raceways are provided with substantially V-shaped socket-like bearings $f$, while the carrier element, designated $k$ carries a pair of knife edges $g$, adapted to be seated in the sockets $f$. In the modified construction according to Figures 4 and 5 the reverse arrangement is used, the socket-like bearing surface $f^1$ being provided at the bottom of the carrier K, while the spacing fish plate $h$ of the supporting frame may be provided with a knife edge, shown in Figure 4, for supporting the sockets $f^1$.

The mounting of the carrier K as herein described enables the carrier to have a rocking or tilting movement with reference to the supporting frame and this is of advantage where the latter is mounted on an uneven surface as an unlevelled pit bottom.

It should be pointed out that in place of balls, rolls or rollers may be used which are embraced in a similar manner by the correspondingly formed races, which latter may be straight or curved, this arrangement constituting a kind of roller cage construction. The invention is, moreover, susceptible of other changes and modifications in accordance with varying requirements of its practical application, and without departing from the spirit and scope of the invention, as defined in the claims.

I claim:

1. In a device of the kind described an upper supporting race and a lower guiding race in spaced parallel relationship and longitudinally displaceable, conveying means above the supporting race, and inter-engaging socket and projection means, arranged to loosely and rockingly support the conveying means on the races, and revoluble bodies between said races.

2. In a device of the kind described an upper supporting race and a lower guiding race in spaced parallel and longituidnally staggered displaceable relationship, and revoluble bodies between said races, conveying means above said races, and rockably inter-engaging socket- and projection means interposed between the supporting race and the conveying means, and serving to loosely and rockably support the conveying means.

3. In a device of the kind described, supporting means, a carrier on said supporting means, inclinable socket-and-stud connection between the carrier and the supporting means, parallelly spaced ball races on said supporting means, revoluble bodies between said ball races, and inwardly turned portions on said races, snugly embracing the revoluble bodies.

4. In a device of the kind described, a carrier, supporting means at the bottom thereof, inclinable socket-and-stud connection between the carrier and the supporting means, parallelly spaced cooperating upper and lower channel-shaped ball races on said supporting means, revoluble bodies movable between said races, and oppositely bent marginal portions on said races, snugly embracing said revoluble bodies.

5. In a device of the character described the combination of a carrier, a slidably mounted support therefor and a pivotal connection betwen the carrier and the slidably mounted support permitting the carrier to have an independent rocking motion.

6. The combination of a carrier and supporting means therefor comprising upper and lower members separated by anti-friction elements permitting the upper members to slide in relation to the lower members, said carrier being rockably and detachably mounted on said upper members and adapted to move therewith in addition to being capable of an independent rocking movement thereon.

In testimony whereof I have signed my name to this specification.

ANTON SKLENÁŘ.